United States Patent
Littich et al.

(10) Patent No.: US 9,932,511 B2
(45) Date of Patent: Apr. 3, 2018

(54) NATURAL OIL-DERIVED WELLBORE COMPOSITIONS AND METHODS OF USE

(71) Applicant: Elevance Renewable Sciences, Inc., Woodridge, IL (US)

(72) Inventors: Ryan Littich, Woodridge, IL (US); Charles Coburn, Woodridge, IL (US)

(73) Assignee: Elevance Renewable Sciences, Inc., Woodridge, IL (US)

( * ) Notice: Subject to any disclaimer, the term of this patent is extended or adjusted under 35 U.S.C. 154(b) by 0 days.

(21) Appl. No.: 14/797,751

(22) Filed: Jul. 13, 2015

(65) Prior Publication Data

US 2016/0032167 A1 Feb. 4, 2016

Related U.S. Application Data

(63) Continuation-in-part of application No. 14/599,093, filed on Jan. 16, 2015.

(60) Provisional application No. 61/928,798, filed on Jan. 17, 2014.

(51) Int. Cl.
*C09K 8/12* (2006.01)
*C09K 8/588* (2006.01)
*C09K 8/584* (2006.01)
*C09K 8/88* (2006.01)

(52) U.S. Cl.
CPC ............... *C09K 8/12* (2013.01); *C09K 8/584* (2013.01); *C09K 8/588* (2013.01); *C09K 8/88* (2013.01)

(58) Field of Classification Search
None
See application file for complete search history.

(56) References Cited

U.S. PATENT DOCUMENTS

| | | | | |
|---|---|---|---|---|
| 3,247,900 A | * | 4/1966 | Perry | C08F 20/60 166/253.1 |
| 4,671,883 A | * | 6/1987 | Connell | C09K 8/32 166/282 |
| 6,544,932 B2 | * | 4/2003 | Klug | C09K 8/52 137/13 |
| 7,410,934 B2 | | 8/2008 | Hughes et al. | |
| 2006/0105919 A1 | * | 5/2006 | Colaco | C09K 8/584 507/209 |
| 2010/0029880 A1 | | 2/2010 | Zhang et al. | |
| 2010/0197529 A1 | | 8/2010 | Favero et al. | |
| 2013/0217604 A1 | | 8/2013 | Fisk | |
| 2013/0266531 A1 | * | 10/2013 | Yuan-Huffman | A61Q 19/00 424/70.16 |
| 2014/0057810 A1 | | 2/2014 | Fisk | |
| 2015/0203741 A1 | | 7/2015 | Littich et al. | |

OTHER PUBLICATIONS

Int'l Search Report & Written Opinion of the Int'l Searching Authority, PCT App. No. PCT/US2015/040137, dated May 13, 2016.

* cited by examiner

*Primary Examiner* — John J Figueroa
(74) *Attorney, Agent, or Firm* — Kilpatrick Townsend & Stockton LLP (57) ABSTRACT

Compositions useful as wellbore fluids are generally disclosed. In some embodiments, the compositions include polymerizable olefinic surfactant compositions, which, under certain conditions, can polymerize via free-radical polymerization to form surfactant polymers. In some embodiments, the compositions are introduced to an oil well as part of the drilling or extraction process, e.g., to assist in flushing hydrocarbon material out of subterranean formations.

19 Claims, 1 Drawing Sheet

NATURAL OIL-DERIVED WELLBORE COMPOSITIONS AND METHODS OF USE

CROSS-REFERENCE TO RELATED APPLICATIONS

The present application is a continuation-in-part of U.S. patent application Ser. No. 14/599,093, filed Jan. 16, 2015, which claims the benefit of priority of U.S. Provisional Application No. 61/928,798, filed Jan. 17, 2014, both of which are hereby incorporated by reference as though fully set forth herein in their entireties.

TECHNICAL FIELD

Compositions useful as wellbore fluids are generally disclosed. In some embodiments, the compositions include polymerizable olefinic surfactant compositions, which, under certain conditions, can polymerize via free-radical polymerization to form surfactant polymers. In some embodiments, the compositions are introduced to an oil well as part of the drilling or extraction process, e.g., to assist in flushing hydrocarbon material out of subterranean formations.

BACKGROUND

Various fluids may be used as part of the process of drilling an oil or gas well. Such fluids can serve a variety of purposes, such as lubrication, cooling, transport of particles generated by the drilling process, and maintenance of the stability of various subterranean formations surrounding the wellbore. In many instances, it can be desirable to flush hydrocarbons out of certain hydrocarbon-containing subterranean formations proximate to the wellbore. Certain drilling fluids can be used for such purposes.

In many instances, it may be desirable to remove such fluids from the formation following their introduction. This can be done through the use of fluid loss control pills. Or, in some other examples, waterborne natural and synthetic polymers can be used, such as guar gum, celluloses (e.g., carboxymethylcellulose, hydroxyethylcellulose, and the like), polyacrylamides, hydrolyzed polyacrylamides, and the like. These compounds are prone to breakdown, however, which may tend to limit their utility in wellbore applications.

Aqueous viscoelastic surfactants offer a partial potential solution. But such compounds may yet break down when exposed to hydrocarbon fluids. Inducing polymerization of the surfactant compounds can remedy some of these disadvantages. For example, one can employ 10-undecenoic acid derivatives as surfactant monomers, which, in turn, can undergo free-radical polymerization to form surfactant-polymer compounds. These compounds can be less susceptible to breakdown. However, in some instances, these compounds can have commercially unacceptable sphere-to-rod transition parameters. Therefore, there is a continuing need to develop new polymerizable aqueous viscoelastic surfactant compositions that may have properties that make their use more suitable as wellbore fluids.

SUMMARY

In a first aspect, the disclosure provides compositions (e.g., wellbore compositions) that include compounds comprising a hydrophilic head portion and a hydrophobic tail portion. In some embodiments, at least a portion of the surfactant compounds have a hydrophobic tail portion having more than 22 carbon atoms, e.g., 24 to 40 carbon atoms. In some embodiments, the hydrophobic tail portion is a saturated straight-chain or branched-chain aliphatic hydrocarbyl group. In some other embodiments, the hydrophobic tail portion is a straight-chain or branched-chain aliphatic hydrocarbyl group having at least one carbon-carbon double bond (e.g., a non-terminal carbon-carbon double bond). In some such embodiments, at least 10% of the one or more carbon-carbon double bonds have a trans (or E) configuration.

In a second aspect, the disclosure provides compositions (e.g., wellbore compositions) that include compounds comprising a hydrophilic head portion and a hydrophobic tail portion, wherein the hydrophobic tail portion has more than 18 carbon atoms (e.g., more than 20 carbon atoms, or more than 22 carbon atoms, such as 24 to 40 carbon atoms) and has at least one carbon-carbon double bond (e.g., a non-terminal carbon-carbon double bond). In some embodiments, the hydrophobic tail portion is a straight-chain or branched-chain aliphatic hydrocarbyl group. In some other embodiments, the hydrophobic tail portion is a straight-chain or branched-chain aliphatic hydrocarbyl group having one or more carbon-carbon double bonds. In some such embodiments, at least 10% of the one or more carbon-carbon double bonds have a trans (or E) configuration.

In a third aspect, the disclosure provides compositions (e.g., wellbore compositions) that include free-radical-polymerizable surfactant compounds comprising a hydrophilic head portion and a hydrophobic tail portion. In some embodiments, the composition further comprises a free-radical initiator. In some further embodiments, the free-radical-polymerizable surfactant compounds include at least one non-terminal carbon-carbon double bond. In some even further embodiments, at least a portion of the free-radical-polymerizable surfactant compounds have a hydrophobic tail portion that has more than 22 carbon atoms, e.g., 24 to 40 carbon atoms.

In a fourth aspect, the disclosure provides compositions (e.g., wellbore compositions) that include polymeric or oligomeric compounds having constitutional units formed from the compounds of any embodiments of the first, second, or third aspects. As noted above, the compounds have a hydrophilic head portion and a hydrophobic tail portion. In some embodiments, surfactant compounds include at least one non-terminal carbon-carbon double bond.

In a fifth aspect, the disclosure provides methods of treating a well (e.g., an oil well) including introducing into the well a composition of any embodiments of the first, second, third, or fourth aspects.

In a sixth aspect, the disclosure provides methods of increasing the permeability of a hydrocarbon-containing subterranean formation including contacting the hydrocarbon-containing subterranean formation with an amount (e.g., an effective amount, or a permeability-inducing-effective amount) of a composition of any embodiments of the first, second, third, or fourth aspects.

Further aspects and embodiments are provided in the foregoing drawings, detailed description and claims.

BRIEF DESCRIPTION OF THE DRAWINGS

The following drawings are provided for purposes of illustrating various embodiments of the compositions and methods disclosed herein. The drawings are provided for illustrative purposes only, and are not intended to describe any preferred compositions or preferred methods, or to serve as a source of any limitations on the scope of the claimed inventions.

DETAILED DESCRIPTION

Figure 1:
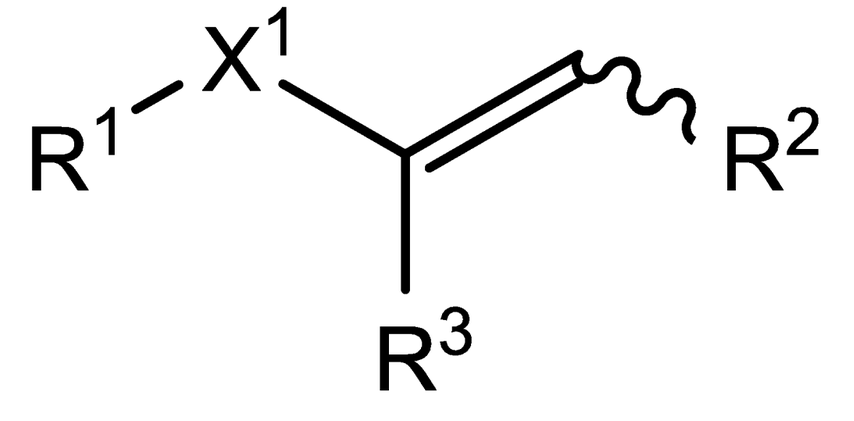
FIG. 1 shows a non-limiting example of a compound of certain embodiments disclosed herein, where $X^1$ is $C_{1-24}$ alkylene, which is optionally oxidized, $R^1$ is a hydrophilic moiety, $R^2$ is $C_{1-60}$ alkyl or $C_{2-60}$ alkenyl, and $R^3$ is a hydrogen atom or $C_{1-6}$ alkyl.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, "polymer" refers to a substance having a chemical structure that includes the multiple repetition of constitutional units formed from substances of comparatively low relative molecular mass relative to the molecular mass of the polymer. The term "polymer" includes soluble and/or fusible molecules having chains of repeat units, and also includes insoluble and infusible networks. As used herein, the term "polymer" can include oligomeric materials, which have only a few (e.g., 5-100) constitutional units As used herein, "monomer" refers to a substance that can undergo a polymerization reaction to contribute constitutional units to the chemical structure of a polymer.

As used herein, "copolymer" refers to a polymer having constitutional units formed from more than one species of monomer.

As used herein, "reaction" and "chemical reaction" refer to the conversion of a substance into a product, irrespective of reagents or mechanisms involved.

As used herein, "reaction product" refers to a substance produced from a chemical reaction of one or more reactant substances.

As used herein, "surfactant" refers generally to any material that can lower the surface tension between two phases. In some embodiments, the surfactants are compounds according to the formula: $(R^a)_n$—$R^b$, where $R^a$ is a hydrophilic moiety (head), $R^b$ is a hydrophobic moiety (tail), n is an integer of at least 1. Such surfactants can be monomers, for example, where n is 1, or can be polymers, for example, where n is greater than 1. The term "free-radical polymerizable surfactant compound" refers to a surfactant, as herein defined, where $R^b$ contains a moiety that can polymerize with other such moieties in the presence of a free-radical initiator. Examples of such groups include, but are not limited to, carbon-carbon double bonds. Such compounds can also be referred to as "olefinic surfactant compounds."

As used herein, "natural oil," "natural feedstock," or "natural oil feedstock" refer to oils derived from plants or animal sources. These terms include natural oil derivatives, unless otherwise indicated. The terms also include modified plant or animal sources (e.g., genetically modified plant or animal sources), unless indicated otherwise. Examples of natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

As used herein, "natural oil derivatives" refers to the compounds or mixtures of compounds derived from a natural oil using any one or combination of methods known in the art. Such methods include but are not limited to saponification, fat splitting, transesterification, esterification, hydrogenation (partial, selective, or full), isomerization, oxidation, and reduction. Representative non-limiting examples of natural oil derivatives include gums, phospholipids, soapstock, acidulated soapstock, distillate or distillate sludge, fatty acids and fatty acid alkyl ester (e.g. non-limiting examples such as 2-ethylhexyl ester), hydroxy substituted variations thereof of the natural oil. For example, the natural oil derivative may be a fatty acid methyl ester ("FAME") derived from the glyceride of the natural oil. In some embodiments, a feedstock includes canola or soybean oil, as a non-limiting example, refined, bleached, and deodorized soybean oil (i.e., RBD soybean oil). Soybean oil typically comprises about 95% weight or greater (e.g., 99% weight or greater) triglycerides of fatty acids. Major fatty acids in the polyol esters of soybean oil include saturated fatty acids, as a non-limiting example, palmitic acid (hexadecanoic acid) and stearic acid (octadecanoic acid), and unsaturated fatty acids, as a non-limiting example, oleic acid (9-octadecenoic acid), linoleic acid (9,12-octadecadienoic acid), and linolenic acid (9,12,15-octadecatrienoic acid).

As used herein, "metathesis catalyst" includes any catalyst or catalyst system that catalyzes an olefin metathesis reaction.

As used herein, "metathesize" or "metathesizing" refer to the reacting of a feedstock in the presence of a metathesis catalyst to form a "metathesized product" comprising new olefinic compounds, i.e., "metathesized" compounds. Metathesizing is not limited to any particular type of olefin metathesis, and may refer to cross-metathesis (i.e., co-metathesis), self-metathesis, ring-opening metathesis, ring-opening metathesis polymerizations ("ROMP"), ring-closing metathesis ("RCM"), and acyclic diene metathesis ("ADMET"). In some embodiments, metathesizing refers to reacting two triglycerides present in a natural feedstock (self-metathesis) in the presence of a metathesis catalyst, wherein each triglyceride has an unsaturated carbon-carbon double bond, thereby forming a new mixture of olefins and esters which may include a triglyceride dimer. Such triglyceride dimers may have more than one olefinic bond, thus higher oligomers also may form. Additionally, in some other embodiments, metathesizing may refer to reacting an olefin, such as ethylene, and a triglyceride in a natural feedstock having at least one unsaturated carbon-carbon double bond, thereby forming new olefinic molecules as well as new ester molecules (cross-metathesis).

As used herein, "hydrocarbon" refers to an organic group composed of carbon and hydrogen, which can be saturated or unsaturated, and can include aromatic groups. The term "hydrocarbyl" refers to a monovalent or polyvalent hydrocarbon moiety.

As used herein, "olefin" or "olefins" refer to compounds having at least one unsaturated carbon-carbon double bond. In certain embodiments, the term "olefins" refers to a group of unsaturated carbon-carbon double bond compounds with different carbon lengths. Unless noted otherwise, the terms "olefin" or "olefins" encompasses "polyunsaturated olefins" or "poly-olefins," which have more than one carbon-carbon double bond. As used herein, the term "monounsaturated olefins" or "mono-olefins" refers to compounds having only one carbon-carbon double bond. A compound having a terminal carbon-carbon double bond can be referred to as a "terminal olefin" or an "alpha-olefin," while an olefin having a non-terminal carbon-carbon double bond can be referred to as an "internal olefin." In some embodiments, the alpha-olefin is a terminal alkene, which is an alkene (as defined below) having a terminal carbon-carbon double bond. Additional carbon-carbon double bonds can be present.

The number of carbon atoms in any group or compound can be represented by the terms: "$C_z$", which refers to a group of compound having z carbon atoms; and "$C_{x-y}$", which refers to a group or compound containing from x to y, inclusive, carbon atoms. For example, "$C_{1-6}$ alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. As a further example, a "$C_{4-10}$ alkene" refers to an alkene molecule having from 4 to 10 carbon atoms, and, for example, includes, but is not limited to, 1-butene, 2-butene, isobutene, 1-pentene, 1-hexene, 3-hexene, 1-heptene, 3-heptene, 1-octene, 4-octene, 1-nonene, 4-nonene, and 1-decene.

As used herein, the term "low-molecular-weight olefin" may refer to any one or combination of unsaturated straight, branched, or cyclic hydrocarbons in the $C_{2-14}$ range. Low-molecular-weight olefins include alpha-olefins, wherein the unsaturated carbon-carbon bond is present at one end of the compound. Low-molecular-weight olefins may also include dienes or trienes. Low-molecular-weight olefins may also include internal olefins or "low-molecular-weight internal olefins." In certain embodiments, the low-molecular-weight internal olefin is in the $C_{4-14}$ range. Examples of low-molecular-weight olefins in the $C_{2-6}$ range include, but are not limited to: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. Non-limiting examples of low-molecular-weight olefins in the $C_{7-9}$ range include 1,4-heptadiene, 1-heptene, 3,6-nonadiene, 3-nonene, 1,4,7-octatriene. Other possible low-molecular-weight olefins include styrene and vinyl cyclohexane. In certain embodiments, it is preferable to use a mixture of olefins, the mixture comprising linear and branched low-molecular-weight olefins in the $C_{4-10}$ range. Olefins in the $C_{4-10}$ range can also be referred to as "short-chain olefins," which can be either branched or unbranched. In one embodiments, it may be preferable to use a mixture of linear and branched $C_4$ olefins (i.e., combinations of: 1-butene, 2-butene, and/or isobutene). In other embodiments, a higher range of $C_{11-14}$ may be used.

In some instances, the olefin can be an "alkene," which refers to a straight- or branched-chain non-aromatic hydrocarbon having 2 to 30 carbon atoms and one or more carbon-carbon double bonds, which may be optionally substituted, as herein further described, with multiple degrees of substitution being allowed. A "monounsaturated alkene" refers to an alkene having one carbon-carbon double bond, while a "polyunsaturated alkene" refers to an alkene having two or more carbon-carbon double bonds. A "lower alkene," as used herein, refers to an alkene having from 2 to 10 carbon atoms.

As used herein, "ester" or "esters" refer to compounds having the general formula: R—COO—R', wherein R and R' denote any organic group (such as alkyl, aryl, or silyl groups) including those bearing heteroatom-containing substituent groups. In certain embodiments, R and R' denote alkyl, alkenyl, aryl, or alcohol groups. In certain embodiments, the term "esters" may refer to a group of compounds with the general formula described above, wherein the compounds have different carbon lengths. In certain embodiments, the esters may be esters of glycerol, which is a trihydric alcohol. The term "glyceride" can refer to esters where one, two, or three of the —OH groups of the glycerol have been esterified.

It is noted that an olefin may also comprise an ester, and an ester may also comprise an olefin, if the R or R' group in the general formula R—COO—R' contains an unsaturated carbon-carbon double bond. Such compounds can be referred to as "unsaturated esters" or "olefin ester" or "olefinic ester compounds." Further, a "terminal olefinic ester compound" may refer to an ester compound where R has an olefin positioned at the end of the chain. An "internal olefin ester" may refer to an ester compound where R has an olefin positioned at an internal location on the chain. Additionally, the term "terminal olefin" may refer to an ester or an acid thereof where R' denotes hydrogen or any organic compound (such as an alkyl, aryl, or silyl group) and R has an olefin positioned at the end of the chain, and the term "internal olefin" may refer to an ester or an acid thereof where R' denotes hydrogen or any organic compound (such as an alkyl, aryl, or silyl group) and R has an olefin positioned at an internal location on the chain.

As used herein, "acid," "acids," "carboxylic acid," or "carboxylic acids" refer to compounds having the general formula: R—COOH, wherein R denotes any organic moiety (such as alkyl, aryl, or silyl groups), including those bearing heteroatom-containing substituent groups. In certain embodiments, R denotes alkyl, alkenyl, aryl, or alcohol groups. In certain embodiments, the term "acids" or "carboxylic acids" may refer to a group of compounds with the general formula described above, wherein the compounds have different carbon lengths.

As used herein, "alcohol" or "alcohols" refer to compounds having the general formula: R—OH, wherein R denotes any organic moiety (such as alkyl, aryl, or silyl groups), including those bearing heteroatom-containing substituent groups. In certain embodiments, R denotes alkyl, alkenyl, aryl, or alcohol groups. In certain embodiments, the term "alcohol" or "alcohols" may refer to a group of compounds with the general formula described above, wherein the compounds have different carbon lengths. As used herein, the term "alkanol" refers to alcohols where R is an alkyl group.

As used herein, "alkyl" refers to a straight or branched chain saturated hydrocarbon having 1 to 30 carbon atoms, which may be optionally substituted, as herein further described, with multiple degrees of substitution being allowed. Examples of "alkyl," as used herein, include, but are not limited to, methyl, ethyl, n-propyl, isopropyl, isobutyl, n-butyl, sec-butyl, tert-butyl, isopentyl, n-pentyl, neopentyl, n-hexyl, and 2-ethylhexyl. In some instances, the "alkyl" group can be divalent, in which case the group can alternatively be referred to as an "alkylene" group.

As used herein, "alkenyl" refers to a straight or branched chain non-aromatic hydrocarbon having 2 to 30 carbon atoms and having one or more carbon-carbon double bonds, which may be optionally substituted, as herein further described, with multiple degrees of substitution being allowed. Examples of "alkenyl," as used herein, include, but are not limited to, ethenyl, 2-propenyl, 2-butenyl, and 3-butenyl. In some instances, the "alkenyl" group can be divalent, in which case the group can alternatively be referred to as an "alkenylene" group.

As used herein, "halogen" or "halo" refers to a fluorine, chlorine, bromine, and/or iodine atom. In some embodiments, the terms refer to fluorine and/or chlorine.

As used herein, "substituted" refers to substitution of one or more hydrogen atoms of the designated moiety with the named substituent or substituents, multiple degrees of substitution being allowed unless otherwise stated, provided that the substitution results in a stable or chemically feasible compound. A stable compound or chemically feasible compound is one in which the chemical structure is not substantially altered when kept at a temperature from about −80° C. to about +40° C., in the absence of moisture or other chemically reactive conditions, for at least a week, or a compound which maintains its integrity long enough to be useful for therapeutic or prophylactic administration to a patient. As used herein, the phrases "substituted with one or more . . . " or "substituted one or more times . . . " refer to a number of substituents that equals from one to the maximum number of substituents possible based on the number of available bonding sites, provided that the above conditions of stability and chemical feasibility are met.

As used herein, "yield" refers to the amount of reaction product formed in a reaction. When expressed with units of percent (%), the term yield refers to the amount of reaction product actually formed, as a percentage of the amount of reaction product that would be formed if all of the limiting reactant were converted into the product.

As used herein, "mix" or "mixed" or "mixture" refers broadly to any combining of two or more compositions. The two or more compositions need not have the same physical state; thus, solids can be "mixed" with liquids, e.g., to form a slurry, suspension, or solution. Further, these terms do not require any degree of homogeneity or uniformity of composition. This, such "mixtures" can be homogeneous or heterogeneous, or can be uniform or non-uniform. Further, the terms do not require the use of any particular equipment to carry out the mixing, such as an industrial mixer.

As used herein, "optionally" means that the subsequently described event(s) may or may not occur. In some embodiments, the optional event does not occur. In some other embodiments, the optional event does occur one or more times.

As used herein, "comprise" or "comprises" or "comprising" or "comprised of" refer to groups that are open, meaning that the group can include additional members in addition to those expressly recited. For example, the phrase, "comprises A" means that A must be present, but that other members can be present too. The terms "include," "have," and "composed of" and their grammatical variants have the same meaning. In contrast, "consist of" or "consists of" or "consisting of" refer to groups that are closed. For example, the phrase "consists of A" means that A and only A is present.

As used herein, "or" is to be given its broadest reasonable interpretation, and is not to be limited to an either/or construction. Thus, the phrase "comprising A or B" means that A can be present and not B, or that B is present and not A, or that A and B are both present. Further, if A, for example, defines a class that can have multiple members, e.g., $A_1$ and $A_2$, then one or more members of the class can be present concurrently.

As used herein, the various functional groups represented will be understood to have a point of attachment at the functional group having the hyphen or dash (-) or an asterisk (*). In other words, in the case of —CH$_2$CH$_2$CH$_3$, it will be understood that the point of attachment is the CH$_2$ group at the far left. If a group is recited without an asterisk or a dash, then the attachment point is indicated by the plain and ordinary meaning of the recited group.

As used herein, multi-atom bivalent species are to be read from left to right. For example, if the specification or claims recite A-D-E and D is defined as —OC(O)—, the resulting group with D replaced is: A-OC(O)-E and not A-C(O)O-E.

Other terms are defined in other portions of this description, even though not included in this subsection.

Wellbore Compositions

In certain aspects, the disclosure provides compositions (e.g., wellbore compositions) that include compounds (e.g., free-radical-polymerizable surfactant compounds) including a hydrophilic head portion and a hydrophobic tail portion. In some embodiments, the compounds are olefinic surfactant compounds, meaning that the hydrophobic tail portion contains at least one carbon-carbon double bond. In some such embodiments, the olefinic surfactant compounds (or at least a portion thereof) have a terminal carbon-carbon double bond. In some embodiments, the olefinic surfactant compounds (or at least a portion thereof) have an internal carbon-carbon double bond.

The hydrophobic tails in the olefinic surfactant compounds can have any suitable chain length or distribution of chain lengths. In some embodiments, at least a portion of the olefinic surfactant compounds include a hydrophobic tail portion having more than 20 carbon atoms, or more than 22 carbon atoms, for example, 24 to 60 carbon atoms, or 24 to 50 carbon atoms, or 24 to 40 carbon atoms. These can be referred to as "extended-chain olefinic surfactant compounds." In some such embodiments, the wellbore composition includes at least 5 percent by weight, or at least 10 percent by weight, or at least 15 percent by weight, or at least 20 percent by weight, or at least 25 percent by weight, or at least 30 percent by weight, or at least 35 percent by weight, or at least 40 percent by weight, or at least 45 percent by weight, or at least 50 percent by weight, of extended-chain olefinic surfactant compounds (according to any of the above embodiments), based on the total weight of olefinic surfactant compounds in the composition. In some such further embodiments, the wellbore composition includes no more than 99 percent by weight, or no more than 97 percent by weight, or no more than 95 percent by weight, or no more than 90 percent by weight, or no more than 85 percent by weight, or no more than 80 percent by weight, or no more than 75 percent by weight, or no more than 70 percent by weight, of extended-chain olefinic surfactant compounds (according to any of the above embodiments), based on the total weight of olefinic surfactant compounds in the composition.

The carbon-carbon double bonds in the olefinic surfactant compounds can have any suitable isomeric configuration (e.g., cis (Z) or trans (E)). For example, in some embodiments, the compositions disclosed herein comprise both olefinic surfactant compounds having a cis configuration at the carbon-carbon double bond and olefinic surfactant compounds having a trans configuration at the carbon-carbon double bond. In some such embodiments, at least 5 percent by weight, or at least 10 percent by weight, or at least 20 percent by weight, or at least 30 percent by weight, or at least 40 percent by weight, or at least 50 percent by weight, or at least 60 percent by weight, or at least 70 percent by weight, of the olefinic surfactant compounds have a trans configuration, based on the total weight of olefinic surfactant compounds in the composition.

In some embodiments, the hydrophobic tail portion is an extended-chain variant of a natural fatty acid moiety, such as extended-chain variants of the fatty-acid chains of the fatty acids of any natural oil, including, but not limited to, oleic acid, linoleic acid, linolenic acid, and erucic acid. For example, in some embodiments, the hydrophobic tail portion of the extended-chain olefinic surfactant compounds is: $-(CH_2)_8-CH=CH-(CH_2)_{13}-CH_3$, $-(CH_2)_8-CH=CH-(CH_2)_{15}-CH_3$, $-(CH_2)_8-CH=CH-(CH_2)_{17}-CH_3$, $-(CH_2)_8-CH=CH-(CH_2)_{19}-CH_3$, $-(CH_2)_8-CH=CH-(CH_2)_{21}-CH_3$, $-(CH_2)_8-CH=CH-(CH_2)_{23}-CH_3$, $-(CH_2)_8-CH=CH-(CH_2)_{25}-CH_3$, or any combination thereof. In some other embodiments, the hydrophobic tail portion of the extended-chain olefinic surfactant compounds is: $-(CH_2)_{12}-CH=CH-(CH_2)_{13}-CH_3$, $-(CH_2)_{12}-CH=CH-(CH_2)_{15}-CH_3$, $-(CH_2)_{12}-CH=CH-(CH_2)_{17}-CH_3$, $-(CH_2)_{12}-CH=CH-(CH_2)_{19}-CH_3$, $-(CH_2)_{12}-CH=CH-(CH_2)_{21}-CH_3$, $-(CH_2)_{12}-CH=CH-(CH_2)_{23}-CH_3$, $-(CH_2)_{12}-CH=CH-(CH_2)_{25}-CH_3$, or any combination thereof. In any of these embodiments, the carbon-carbon double bond can be in the cis or trans configuration, according to the embodiments described in the immediately preceding paragraph.

In some embodiments, the hydrophobic tail portion is an extended-chain variant of a natural fatty acid moiety, such as extended-chain variants of the fatty-acid chains of the fatty acids of any natural oil, including, but not limited to, oleic acid, linoleic acid, linolenic acid, and erucic acid. For example, in some embodiments, the hydrophobic tail portion of the extended-chain olefinic surfactant compounds is: $-C(=O)-(CH_2)_7-CH=CH-(CH_2)_{13}-CH_3$, $-C(=O)-(CH_2)_7-CH=CH-(CH_2)_{15}-CH_3$, $-C(=O)-(CH_2)_7-CH=CH-(CH_2)_{17}-CH_3$, $-C(=O)-(CH_2)_7-CH=CH-(CH_2)_{19}-CH_3$, $-C(=O)-(CH_2)_7-CH=CH-(CH_2)_{21}-CH_3$, $-C(=O)-(CH_2)_7-CH=CH-(CH_2)_{23}-CH_3$, $-C(=O)-(CH_2)_7-CH=CH-(CH_2)_{25}-CH_3$, $-C(=O)-(CH_2)_7-CH=CH-(CH_2)_{11}-CH_3$ or any combination thereof. In some embodiments, the hydrophobic tail portion of the extended-chain olefinic surfactant compounds is $-C(=O)-(CH_2)_7-CH=CH-(CH_2)_{11}-CH_3$. In some embodiments, the hydrophobic tail portion of the extended-chain olefinic surfactant compounds is $-C(=O)-(CH_2)_7-CH=CH-(CH_2)_{13}-CH_3$. In some embodiments, the hydrophobic tail portion of the extended-chain olefinic surfactant compounds is $-C(=O)-(CH_2)_7-CH=CH-(CH_2)_{15}-CH_3$. In some embodiments, the hydrophobic tail portion of the extended-chain olefinic surfactant compounds is $-C(=O)-(CH_2)_7-CH=CH-(CH_2)_{17}-CH_3$. In some other embodiments, the hydrophobic tail portion of the extended-chain olefinic surfactant compounds is: $-C(=O)-(CH_2)_{11}-CH=CH-(CH_2)_{13}-CH_3$, $-C(=O)-(CH_2)_{11}-CH=CH-(CH_2)_{15}-CH_3$, $-C(=O)-(CH_2)_{11}-CH=CH-(CH_2)_{17}-CH_3$, $-C(=O)-(CH_2)_{11}-CH=CH-(CH_2)_{19}-CH_3$, $-C(=O)-(CH_2)_{11}-CH=CH-(CH_2)_{21}-CH_3$, $-C(=O)-(CH_2)_{11}-CH=CH-(CH_2)_{23}-CH_3$, $-C(=O)-(CH_2)_{11}-CH=CH-(CH_2)_{25}-CH_3$, $-C(=O)-(CH_2)_{11}-CH=CH-(CH_2)_{11}-CH_3$, or any combination thereof. In some embodiments, the hydrophobic tail portion of the extended-chain olefinic surfactant compounds is $-C(=O)-(CH_2)_7-CH=CH-(CH_2)_{11}-CH_3$. In some embodiments, the hydrophobic tail portion of the extended-chain olefinic surfactant compounds is $-C(=O)-(CH_2)_7-CH=CH-(CH_2)_{13}-CH_3$. In some embodiments, the hydrophobic tail portion of the extended-chain olefinic surfactant compounds is $-C(=O)-(CH_2)_7-CH=CH-(CH_2)_{15}-CH_3$. In some embodiments, the hydrophobic tail portion of the extended-chain olefinic surfactant compounds is $-C(=O)-(CH_2)_7-CH=CH-(CH_2)_{17}-CH_3$. In any of these embodiments, the carbon-carbon double bond can be in the cis or trans configuration, according to the embodiments described in the immediately preceding paragraph.

In some embodiments, the compositions can contain compounds having a saturated hydrophobic tail portion. These can be made, for example, by hydrogenating unsaturated fatty acids made by the methods disclosed herein, e.g., before attachment of the hydrophilic head. For example, in some embodiments, the hydrophobic tail portion is a saturated alkyl group having 22 to 40 carbon atoms, or 24 to 40 carbon atoms, which can be optionally oxidized. In some embodiments, the hydrophobic tail portion is $-(CH_2)_{21}-CH_3$, $-(CH_2)_{23}-CH_3$, $-(CH_2)_{25}-CH_3$, $-(CH_2)_{27}-CH_3$, $-(CH_2)_{29}-CH_3$, or combinations thereof. In some embodiments, the hydrophobic tail portion is $-C(=O)-(CH_2)_{20}-CH_3$, $-C(=O)-(CH_2)_{22}-CH_3$, $-C(=O)-(CH_2)_{24}-CH_3$, $-C(=O)-(CH_2)_{26}-CH_3$, $-C(=O)-(CH_2)_{28}-CH_3$, or combinations thereof.

The surfactant compounds can contain any suitable hydrophilic head group, which are well known in the art. These include, but are not limited to, anionic surfactant head groups, a cationic surfactant head group, a zwitterionic head groups, a non-ionic surfactant head groups, or any combination thereof. Examples include quarternary ammonium compounds, which can be substituted with various moieties, such as alkyl groups, carboxylates, amido groups, betaines, sultaines, hydroxysultaines, hydroxyalkyl groups, oxides, glucosides, and the like. Other examples include sulfur-containing compounds, such as sulfates or sulfonates, which can be optionally substituted. In some embodiments, the hydrophilic head comprises an amine and/or an amine oxide. In some embodiments, the hydrophilic head is —NH—($C_{1-6}$ alkylene)-N($C_{1-6}$ alkyl)$_2$ or —NH—($C_{1-6}$ alkylene)-N(O)($C_{1-6}$ alkyl)$_2$, such as —NH—($CH_2$)$_3$—N($CH_3$)$_2$ or —NH—($CH_2$)$_3$—N(O)($CH_3$)$_2$.

In some embodiment, the free-radical-polymerizable surfactant compounds are compounds according to formula (I):

(I)

wherein $X^1$ is $C_{1-24}$ alkylene, which is optionally oxidized at the carbon atom adjacent to $R^1$, and is optionally substituted;

wherein $R^1$ is a hydrophilic moiety;

wherein $R^2$ is $C_{1-60}$ alkyl or $C_{2-60}$ alkenyl, each of which is optionally substituted; and wherein $R^3$ is a hydrogen atom or $C_{1-6}$ alkyl, which is optionally substituted.

In some embodiments, $R^1$ is an anionic surfactant head group, a cationic surfactant head group, a zwitterionic head group, or a non-ionic surfactant head group. In some such embodiments, $R^1$ is comprises a quarternary ammonium group, which is optionally substituted. In some other embodiments, $R^1$ comprises a sulfate group, which is optionally substituted. In some embodiments, $R^1$ comprises an amine and/or an amine oxide. In some embodiments, the hydrophilic head is —NH—($C_{1-6}$ alkylene)-N($C_{1-6}$ alkyl)$_2$ or —NH—($C_{1-6}$ alkylene)-N(O)($C_{1-6}$ alkyl)$_2$, such as —NH—($CH_2$)$_3$—N($CH_3$)$_2$ or —NH—($CH_2$)$_3$—N(O)($CH_3$)$_2$.

In some embodiments, $X^1$ is a straight-chain $C_{4-10}$ alkylene, which is optionally oxidized at the carbon atom adjacent to $R^1$. In some such embodiments, $X^1$ is —(C=O)—($CH_2$)$_7$—, —($CH_2$)$_8$—, —(C=O)—($CH_2$)$_{11}$— or —($CH_2$)$_{12}$. In some embodiments, $X^1$ is —($CH_2$)$_8$—. In some embodiments, $X^1$ is —($CH_2$)$_{12}$—. In some embodiments, $X^1$ is —C(=O)—($CH_2$)$_7$—. In some embodiments, $X^1$ is —C(=O)—($CH_2$)$_{11}$—.

In some embodiments, $R^3$ is a hydrogen atom.

In some embodiments, $R^2$ is $C_{1-7}$ alkyl. In some such embodiments, $R^2$ is methyl, ethyl, propyl, butyl, pentyl, hexyl, or heptyl. In some embodiments, $R^2$ is $C_{9-11}$ alkyl. In some such embodiments, $R^2$ is nonyl, decyl, or undecyl. In some embodiments, $R^2$ is $C_{13-30}$ alkyl. In some embodiments, $R^2$ is tetradecyl, hexadecyl, octadecyl, icosanyl, docosanyl, or tetracosanyl. In some embodiments, $R^2$ is octyl. In some embodiments, $R^2$ is decyl. In some embodiments, $R^2$ is dodecyl. In some embodiments, $R^2$ is tetradecyl. In some embodiments, $R^2$ is hexadecyl. In some embodiments, $R^2$ is octadecyl.

The carbon-carbon double bond in the compound of formula (I) can be in any suitable configuration, e.g., cis or trans. For example, in some embodiments, the compositions disclosed herein comprise both olefinic surfactant compounds having a cis configuration at the carbon-carbon double bond and olefinic surfactant compounds having a trans configuration at the carbon-carbon double bond. In some such embodiments, at least 5 percent by weight, or at least 10 percent by weight, or at least 20 percent by weight, or at least 30 percent by weight, or at least 40 percent by weight, or at least 50 percent by weight, or at least 60 percent by weight, or at least 70 percent by weight, of the olefinic surfactant compounds have a trans configuration, based on the total weight of olefinic surfactant compounds in the composition.

In some embodiments, the composition further comprises a free-radical initiator. Any suitable free-radical initiator can be used. Because initiation would generally occur in an aqueous environment, water-soluble initiators may be preferred. Suitable initiators include, but are not limited to, potassium persulfate, ammonium peroxydiphosphate, azo-type initiators such as 2,2'-azo bisamidino-propane hydrochloride, hydrogen peroxide, and any combination thereof.

The wellbore composition can also include water, e.g., as a carrier or as a component of a carrier. In some such embodiments, the wellbore composition is an emulsion, such as a microemulsion or a nanoemulsion.

The wellbore composition may further include one or more additives or other ingredients, including, but not limited to, carriers, solvents, co-solvents (such as longer-chain olefinic ester compounds), surfactants, co-surfactants, emulsifiers, natural or synthetic colorants, natural or synthetic fragrances, antioxidants, corrosion inhibitors, and antimicrobial agents.

In certain aspects, such as after the olefinic surfactant compounds have polymerized, the disclosure provides compositions (e.g., wellbore compositions) that include polymers that include constitutional units formed from the polymerization of monomer compounds of formula (II):

(II)

wherein $X^2$ is $C_{1-24}$ alkylene, which is optionally oxidized at the carbon atom adjacent to $R^4$, and is optionally substituted;

wherein $R^4$ is a hydrophilic moiety;

wherein $R^5$ is $C_{1-60}$ alkyl or $C_{2-60}$ alkenyl, each of which is optionally substituted; and wherein $R^6$ is a hydrogen atom or $C_{1-6}$ alkyl, which is optionally substituted.

In some embodiments, $R^4$ is an anionic surfactant head group, a cationic surfactant head group, a zwitterionic head group, or a non-ionic surfactant head group. In some such embodiments, $R^4$ is comprises a quarternary ammonium group, which is optionally substituted. In some other embodiments, $R^4$ comprises a sulfate group, which is optionally substituted. In some embodiments, $R^4$ comprises an amine and/or an amine oxide. In some embodiments, the hydrophilic head is —NH—($C_{1-6}$ alkylene)-N($C_{1-6}$ alkyl)$_2$ or —NH—($C_{1-6}$ alkylene)-N(O)($C_{1-6}$ alkyl)$_2$, such as —NH—($CH_2$)$_3$—N($CH_3$)$_2$ or —NH—($CH_2$)$_3$—N(O)($CH_3$)$_2$.

In some embodiments, $X^2$ is a straight-chain $C_{4-10}$ alkylene, which is optionally oxidized at the carbon atom adjacent to $R^4$. In some such embodiments, $X^2$ is —(C=O)—($CH_2$)$_7$—, —($CH_2$)$_8$—, —(C=O)—($CH_2$)$_{11}$— or —($CH_2$)$_{12}$. In some embodiments, $X^2$ is —($CH_2$)$_8$—. In some embodiments, $X^2$ is —$(CH_2)_{12}$—. In some embodiments, $X^2$ is —$C(=O)$—$(CH_2)_7$—. In some embodiments, $X^2$ is —$C(=O)$—$(CH_2)_{11}$—.

In some embodiments, $R^6$ is a hydrogen atom.

In some embodiments, $R^5$ is $C_{1-7}$ alkyl. In some such embodiments, $R^5$ is methyl, ethyl, propyl, butyl, pentyl, hexyl, or heptyl. In some embodiments, $R^5$ is $C_{9-11}$ alkyl. In some such embodiments, $R^5$ is nonyl, decyl, or undecyl. In some embodiments, $R^5$ is $C_{13-30}$ alkyl. In some embodiments, $R^5$ is tetradecyl, hexadecyl, octadecyl, icosanyl, docosanyl, or tetracosanyl. In some embodiments, $R^5$ is octyl. In some embodiments, $R^5$ is decyl. In some embodiments, $R^5$ is dodecyl. In some embodiments, $R^5$ is tetradecyl. In some embodiments, $R^5$ is hexadecyl. In some embodiments, $R^5$ is octadecyl.

The carbon-carbon double bond in the compound of formula (II) can be in any suitable configuration, e.g., cis or trans. For example, in some embodiments, the compositions disclosed herein comprise both olefinic surfactant compounds having a cis configuration at the carbon-carbon double bond and olefinic surfactant compounds having a trans configuration at the carbon-carbon double bond. In some such embodiments, at least 5 percent by weight, or at least 10 percent by weight, or at least 20 percent by weight, or at least 30 percent by weight, or at least 40 percent by weight, or at least 50 percent by weight, or at least 60 percent by weight, or at least 70 percent by weight, of the olefinic surfactant compounds have a trans configuration, based on the total weight of olefinic surfactant compounds in the composition.

In some embodiments, constitutional units formed by compounds of formula (II) make up at least 50 percent by weight, or at least 60 percent by weight, or at least 70 percent by weight, or at least 80 percent by weight, or at least 90 percent by weight, or at least 95 percent by weight, or at least 97 percent by weight, based on the number-average molecular weight of the polymers. In some embodiments, the polymers consist essentially of constitutional units formed from compounds of formula (II). Such polymers can include any number of constitutional units. In some embodiments, the polymers include 5 to 200 constitutional units, or 5 to 100 constitutional units, or 5 to 70 constitutional units. In some embodiments, the polymers have a number average molecular weight of 1,000 Da to 200,000 Da, or of 1,000 Da to 100,000 Da.

Such compositions can also include water, for example, as a carrier or as part of a carrier. The wellbore composition may further include one or more additives or other ingredients, including, but not limited to, carriers, solvents, co-solvents (such as longer-chain olefinic ester compounds), surfactants, co-surfactants, emulsifiers, natural or synthetic colorants, natural or synthetic fragrances, antioxidants, corrosion inhibitors, and antimicrobial agents.

In certain aspects, such after the olefinic surfactant compounds have polymerized, the disclosure provides compositions (e.g., wellbore compositions) that include polymers that include constitutional units of formula (III):

(III)

wherein $X^3$ is $C_{1-24}$ alkylene, which is optionally oxidized at the carbon atom adjacent to $R^7$, and is optionally substituted;

wherein $R^7$ is a hydrophilic moiety;

wherein $R^8$ is $C_{1-60}$ alkyl or $C_{2-60}$ alkenyl, each of which is optionally substituted; and wherein y is 5 to 200, or 5 to 100, or 5 to 50.

In some embodiments, $R^7$ is an anionic surfactant head group, a cationic surfactant head group, a zwitterionic head group, or a non-ionic surfactant head group. In some such embodiments, $R^7$ is comprises a quarternary ammonium group, which is optionally substituted. In some other embodiments, $R^7$ comprises a sulfate group, which is optionally substituted. In some embodiments, $R^7$ comprises an amine and/or an amine oxide. In some embodiments, the hydrophilic head is —NH—$(C_{1-6}$ alkylene)-N$(C_{1-6}$ alkyl)$_2$ or —NH—$(C_{1-6}$ alkylene)-N(O)$(C_{1-6}$ alkyl)$_2$, such as —NH—$(CH_2)_3$—N$(CH_3)_2$ or —NH—$(CH_2)_3$—N(O)$(CH_3)_2$.

In some embodiments, $X^3$ is a straight-chain $C_{4-10}$ alkylene, which is optionally oxidized at the carbon atom adjacent to $R^7$. In some such embodiments, $X^3$ is —$(C=O)$—$(CH_2)_7$—, —$(CH_2)_8$—, —$(C=O)$—$(CH_2)_{11}$— or —$(CH_2)_{12}$. In some embodiments, $X^3$ is —$(CH_2)_8$—. In some embodiments, $X^3$ is —$(CH_2)_{12}$—. In some embodiments, $X^3$ is —$C(=O)$—$(CH_2)_7$—. In some embodiments, $X^3$ is —$C(=O)$—$(CH_2)_{11}$—.

In some embodiments, $R^8$ is $C_{1-7}$ alkyl. In some such embodiments, $R^8$ is methyl, ethyl, propyl, butyl, pentyl, hexyl, or heptyl. In some embodiments, $R^8$ is $C_{9-11}$ alkyl. In some such embodiments, $R^8$ is nonyl, decyl, or undecyl. In some embodiments, $R^8$ is $C_{13-30}$ alkyl. In some embodiments, $R^8$ is tetradecyl, hexadecyl, octadecyl, icosanyl, docosanyl, or tetracosanyl. In some embodiments, $R^8$ is octyl. In some embodiments, $R^8$ is decyl. In some embodiments, $R^8$ is dodecyl. In some embodiments, $R^8$ is tetradecyl. In some embodiments, $R^8$ is hexadecyl. In some embodiments, $R^8$ is octadecyl.

In some embodiments, constitutional units formed by compounds of formula (II) make up at least 50 percent by weight, or at least 60 percent by weight, or at least 70 percent by weight, or at least 80 percent by weight, or at least 90 percent by weight, or at least 95 percent by weight, or at least 97 percent by weight, based on the number-average molecular weight of the polymers. In some embodiments, the polymers consist essentially of constitutional units of formula (III). Such polymers can include any number of constitutional units. In some embodiments, the polymers include 5 to 200 constitutional units, or 5 to 100 constitutional units, or 5 to 70 constitutional units. In some embodiments, the polymers have a number average molecular weight of 1,000 Da to 200,000 Da, or of 1,000 Da to 100,000 Da.

Such compositions can also include water, for example, as a carrier or as part of a carrier. The wellbore composition may further include one or more additives or other ingredients, including, but not limited to, carriers, solvents, co-solvents (such as longer-chain olefinic ester compounds), surfactants, co-surfactants, emulsifiers, natural or synthetic colorants, natural or synthetic fragrances, antioxidants, corrosion inhibitors, and antimicrobial agents.

In any of the above aspects and embodiments, the olefinic surfactant compounds can be derived from a natural oil or a natural oil derivative, e.g., by a process that includes olefin metathesis. For example, such extended-chain hydrophobic tails can be made by cross-metathesizing a natural oil-based fatty acid, such as oleic acid or erucic acid, with a longer-chain olefin, such as 1-hexadecene, 1-octadecene, and the like.

In any of the above-mentioned compositions, the surfactant compounds and any polymers formed therefrom, can aggregate to form various micelles in the composition, including spherical micelles and worm-like micelles.

Derivation from Renewable Sources

The olefinic surfactant compounds employed in any of the aspects or embodiments disclosed herein can, in certain embodiments, be derived from renewable sources, such as from various natural oils or their derivatives. Any suitable methods can be used to make these compounds from such renewable sources. Suitable methods include, but are not limited to, fermentation, conversion by bioorganisms, and conversion by metathesis.

Olefin metathesis provides one possible means to convert certain natural oil feedstocks into olefins and esters that can be used in a variety of applications, or that can be further modified chemically and used in a variety of applications. In some embodiments, a composition (or components of a composition) may be formed from a renewable feedstock, such as a renewable feedstock formed through metathesis reactions of natural oils and/or their fatty acid or fatty ester derivatives. When compounds containing a carbon-carbon double bond undergo metathesis reactions in the presence of a metathesis catalyst, some or all of the original carbon-carbon double bonds are broken, and new carbon-carbon double bonds are formed. The products of such metathesis reactions include carbon-carbon double bonds in different locations, which can provide unsaturated organic compounds having useful chemical properties.

A wide range of natural oils, or derivatives thereof, can be used in such metathesis reactions. Examples of suitable natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

The natural oil may include canola or soybean oil, such as refined, bleached and deodorized soybean oil (i.e., RBD soybean oil). Soybean oil typically includes about 95 percent by weight (wt %) or greater (e.g., 99 wt % or greater) triglycerides of fatty acids. Major fatty acids in the polyol esters of soybean oil include but are not limited to saturated fatty acids such as palmitic acid (hexadecanoic acid) and stearic acid (octadecanoic acid), and unsaturated fatty acids such as oleic acid (9-octadecenoic acid), linoleic acid (9,12-octadecadienoic acid), and linolenic acid (9,12,15-octadecatrienoic acid).

Metathesized natural oils can also be used. Examples of metathesized natural oils include but are not limited to a metathesized vegetable oil, a metathesized algal oil, a metathesized animal fat, a metathesized tall oil, a metathesized derivatives of these oils, or mixtures thereof. For example, a metathesized vegetable oil may include metathesized canola oil, metathesized rapeseed oil, metathesized coconut oil, metathesized corn oil, metathesized cottonseed oil, metathesized olive oil, metathesized palm oil, metathesized peanut oil, metathesized safflower oil, metathesized sesame oil, metathesized soybean oil, metathesized sunflower oil, metathesized linseed oil, metathesized palm kernel oil, metathesized tung oil, metathesized jatropha oil, metathesized mustard oil, metathesized camelina oil, metathesized pennycress oil, metathesized castor oil, metathesized derivatives of these oils, or mixtures thereof. In another example, the metathesized natural oil may include a metathesized animal fat, such as metathesized lard, metathesized tallow, metathesized poultry fat, metathesized fish oil, metathesized derivatives of these oils, or mixtures thereof.

Such natural oils, or derivatives thereof, can contain esters, such as triglycerides, of various unsaturated fatty acids. The identity and concentration of such fatty acids varies depending on the oil source, and, in some cases, on the variety. In some embodiments, the natural oil comprises one or more esters of oleic acid, linoleic acid, linolenic acid, or any combination thereof. When such fatty acid esters are metathesized, new compounds are formed. For example, in embodiments where the metathesis uses certain short-chain olefins, e.g., ethylene, propylene, or 1-butene, and where the natural oil includes esters of oleic acid, an amount of 1-decene and 1-decenoid acid (or an ester thereof), among other products, are formed. Following transesterification, for example, with an alkyl alcohol, an amount of 9-denenoic acid alkyl ester is formed. In some such embodiments, a separation step may occur between the metathesis and the transesterification, where the alkenes are separated from the esters. In some other embodiments, transesterification can occur before metathesis, and the metathesis is performed on the transesterified product.

In some embodiments, the natural oil can be subjected to various pre-treatment processes, which can facilitate their utility for use in certain metathesis reactions. Useful pre-treatment methods are described in United States Patent Application Publication Nos. 2011/0113679, 2014/0275595, and 2014/0275681, all three of which are hereby incorporated by reference as though fully set forth herein.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself. In other embodiments, the natural oil or unsaturated ester undergoes a cross-metathesis reaction with the low-molecular-weight olefin or mid-weight olefin. The self-metathesis and/or cross-metathesis reactions form a metathesized product wherein the metathesized product comprises olefins and esters.

In some embodiments, the low-molecular-weight olefin (or short-chain olefin) is in the $C_{2-6}$ range. As a non-limiting example, in one embodiment, the low-molecular-weight olefin may comprise at least one of: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. In some embodiments, the short-chain olefin is 1-butene. In some instances, a higher-molecular-weight olefin can also be used.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above). In some such embodiments, the metathesis is a cross-metathesis of any of the aforementioned unsaturated triglyceride species with another olefin, e.g., an alkene. In some such embodiments, the alkene used in the cross-metathesis is a lower alkene, such as ethylene, propylene, 1-butene, 2-butene, etc. In some embodiments, the alkene is ethylene. In some other embodiments, the alkene is propylene. In some further embodiments, the alkene is 1-butene. And in some even further embodiments, the alkene is 2-butene.

Metathesis reactions can provide a variety of useful products, when employed in the methods disclosed herein. For example, the unsaturated esters may be derived from a natural oil feedstock, in addition to other valuable compositions. Moreover, in some embodiments, a number of valuable compositions can be targeted through the self-metathesis reaction of a natural oil feedstock, or the cross-metathesis reaction of the natural oil feedstock with a low-molecular-weight olefin or mid-weight olefin, in the presence of a metathesis catalyst. Such valuable compositions can include fuel compositions, detergents, surfactants, and other specialty chemicals. Additionally, transesterified products (i.e., the products formed from transesterifying an ester in the presence of an alcohol) may also be targeted, non-limiting examples of which include: fatty acid methyl esters ("FAMEs"); biodiesel; 9-decenoic acid ("9DA") esters, 9-undecenoic acid ("9UDA") esters, and/or 9-dodecenoic acid ("9DDA") esters; 9DA, 9UDA, and/or 9DDA; alkali metal salts and alkaline earth metal salts of 9DA, 9UDA, and/or 9DDA; dimers of the transesterified products; and mixtures thereof.

Further, in some embodiments, multiple metathesis reactions can also be employed. In some embodiments, the multiple metathesis reactions occur sequentially in the same reactor. For example, a glyceride containing linoleic acid can be metathesized with a terminal lower alkene (e.g., ethylene, propylene, 1-butene, and the like) to form 1,4-decadiene, which can be metathesized a second time with a terminal lower alkene to form 1,4-pentadiene. In other embodiments, however, the multiple metathesis reactions are not sequential, such that at least one other step (e.g., transesterification, hydrogenation, etc.) can be performed between the first metathesis step and the following metathesis step. These multiple metathesis procedures can be used to obtain products that may not be readily obtainable from a single metathesis reaction using available starting materials. For example, in some embodiments, multiple metathesis can involve self-metathesis followed by cross-metathesis to obtain metathesis dimers, trimmers, and the like. In some other embodiments, multiple metathesis can be used to obtain olefin and/or ester components that have chain lengths that may not be achievable from a single metathesis reaction with a natural oil triglyceride and typical lower alkenes (e.g., ethylene, propylene, 1-butene, 2-butene, and the like). Such multiple metathesis can be useful in an industrial-scale reactor, where it may be easier to perform multiple metathesis than to modify the reactor to use a different alkene.

For example, multiple metathesis can be employed to make the extended-chain olefinic surfactant compounds disclosed herein. In some embodiments, alkyl esters of 9-decenoic acid, 9-undecenoic acid, 9-dodecenoic acid, 13-tetradecenoic acid, 13-pentadecenoic acid, 13-hexadecenoic acid, or any combination thereof, can be further metathesized with a mid-weight olefin, such as 1-hexadecene, 1-octadecene, 1-icosene, 1-docosene, 1-tetracosene, 1-hexacosene, 1-octacosene, and the like, which would yield $C_{24+}$ alkyl esters. The ester groups can then be reacted by conventional means to substitute the ester group with a suitable hydrophilic group (as described above). Other non-natural-chain-length compounds can be made by analogous means.

In some alternate embodiments, the fatty acid can be metathesized directly with a mid-weight olefin, such as those described above. This can provide an alternate means of obtaining $C_{22+}$ alkyl esters or $C_{24+}$ alkyl esters. The saturated versions can be made by hydrogenating the unsaturated fatty acid.

The conditions for such metathesis reactions, and the reactor design, and suitable catalysts are described above with reference to the metathesis of olefin esters. That discussion is incorporated by reference as though fully set forth herein.

In the embodiments above, the natural oil (e.g., as a glyceride) is metathesized, followed by transesterification. In some other embodiments, transesterification can precede metathesis, such that the fatty acid esters subjected to metathesis are fatty acid esters of monohydric alcohols, such as methanol, ethanol, or isopropanol.

Olefin Metathesis

In some embodiments, one or more of the unsaturated monomers can be made by metathesizing a natural oil or natural oil derivative. The terms "metathesis" or "metathesizing" can refer to a variety of different reactions, including, but not limited to, cross-metathesis, self-metathesis, ring-opening metathesis, ring-opening metathesis polymerizations ("ROMP"), ring-closing metathesis ("RCM"), and acyclic diene metathesis ("ADMET"). Any suitable metathesis reaction can be used, depending on the desired product or product mixture.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself. In other embodiments, the natural oil or unsaturated ester undergoes a cross-metathesis reaction with the low-molecular-weight olefin or mid-weight olefin. The self-metathesis and/or cross-metathesis reactions form a metathesized product wherein the metathesized product comprises olefins and esters.

In some embodiments, the low-molecular-weight olefin is in the $C_{2-6}$ range. As a non-limiting example, in one embodiment, the low-molecular-weight olefin may comprise at least one of: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. In some instances, a higher-molecular-weight olefin can also be used.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above). In some such embodiments, the metathesis is a cross-metathesis of any of the aforementioned unsaturated triglyceride species with another olefin, e.g., an alkene. In some such embodiments, the alkene used in the cross-metathesis is a lower alkene, such as ethylene, propylene, 1-butene, 2-butene, etc. In some embodiments, the alkene is ethylene. In some other embodiments, the alkene is propylene. In some further embodiments, the alkene is 1-butene. And in some even further embodiments, the alkene is 2-butene.

Metathesis reactions can provide a variety of useful products, when employed in the methods disclosed herein. For example, terminal olefins and internal olefins may be derived from a natural oil feedstock, in addition to other valuable compositions. Moreover, in some embodiments, a number of valuable compositions can be targeted through the self-metathesis reaction of a natural oil feedstock, or the cross-metathesis reaction of the natural oil feedstock with a low-molecular-weight olefin or mid-weight olefin, in the presence of a metathesis catalyst. Such valuable compositions can include fuel compositions, detergents, surfactants, and other specialty chemicals. Additionally, transesterified products (i.e., the products formed from transesterifying an ester in the presence of an alcohol) may also be targeted, non-limiting examples of which include: fatty acid methyl esters ("FAMEs"); biodiesel; 9-decenoic acid ("9DA") esters, 9-undecenoic acid ("9UDA") esters, and/or 9-dodecenoic acid ("9DDA") esters; 9DA, 9UDA, and/or 9DDA; alkali metal salts and alkaline earth metal salts of 9DA, 9UDA, and/or 9DDA; dimers of the transesterified products; and mixtures thereof.

Further, in some embodiments, the methods disclosed herein can employ multiple metathesis reactions. In some embodiments, the multiple metathesis reactions occur sequentially in the same reactor. For example, a glyceride containing linoleic acid can be metathesized with a terminal lower alkene (e.g., ethylene, propylene, 1-butene, and the like) to form 1,4-decadiene, which can be metathesized a second time with a terminal lower alkene to form 1,4-pentadiene. In other embodiments, however, the multiple metathesis reactions are not sequential, such that at least one other step (e.g., transesterification, hydrogenation, etc.) can be performed between the first metathesis step and the following metathesis step. These multiple metathesis procedures can be used to obtain products that may not be readily obtainable from a single metathesis reaction using available starting materials. For example, in some embodiments, multiple metathesis can involve self-metathesis followed by cross-metathesis to obtain metathesis dimers, trimmers, and the like. In some other embodiments, multiple metathesis can be used to obtain olefin and/or ester components that have chain lengths that may not be achievable from a single metathesis reaction with a natural oil triglyceride and typical lower alkenes (e.g., ethylene, propylene, 1-butene, 2-butene, and the like). Such multiple metathesis can be useful in an industrial-scale reactor, where it may be easier to perform multiple metathesis than to modify the reactor to use a different alkene.

The metathesis process can be conducted under any conditions adequate to produce the desired metathesis products. For example, stoichiometry, atmosphere, solvent, temperature, and pressure can be selected by one skilled in the art to produce a desired product and to minimize undesirable byproducts. In some embodiments, the metathesis process may be conducted under an inert atmosphere. Similarly, in embodiments where a reagent is supplied as a gas, an inert gaseous diluent can be used in the gas stream. In such embodiments, the inert atmosphere or inert gaseous diluent typically is an inert gas, meaning that the gas does not interact with the metathesis catalyst to impede catalysis to a substantial degree. For example, non-limiting examples of inert gases include helium, neon, argon, and nitrogen, used individually or in with each other and other inert gases.

The reactor design for the metathesis reaction can vary depending on a variety of factors, including, but not limited to, the scale of the reaction, the reaction conditions (heat, pressure, etc.), the identity of the catalyst, the identity of the materials being reacted in the reactor, and the nature of the feedstock being employed. Suitable reactors can be designed by those of skill in the art, depending on the relevant factors, and incorporated into a refining process such, such as those disclosed herein.

The metathesis reactions disclosed herein generally occur in the presence of one or more metathesis catalysts. Such methods can employ any suitable metathesis catalyst. The metathesis catalyst in this reaction may include any catalyst or catalyst system that catalyzes a metathesis reaction. Any known metathesis catalyst may be used, alone or in combination with one or more additional catalysts. Examples of metathesis catalysts and process conditions are described in US 2011/0160472, incorporated by reference herein in its entirety, except that in the event of any inconsistent disclosure or definition from the present specification, the disclosure or definition herein shall be deemed to prevail. A number of the metathesis catalysts described in US 2011/0160472 are presently available from Materia, Inc. (Pasadena, Calif.).

In some embodiments, the metathesis catalyst includes a Grubbs-type olefin metathesis catalyst and/or an entity derived therefrom. In some embodiments, the metathesis catalyst includes a first-generation Grubbs-type olefin metathesis catalyst and/or an entity derived therefrom. In some embodiments, the metathesis catalyst includes a second-generation Grubbs-type olefin metathesis catalyst and/ or an entity derived therefrom. In some embodiments, the metathesis catalyst includes a first-generation Hoveyda-Grubbs-type olefin metathesis catalyst and/or an entity derived therefrom. In some embodiments, the metathesis catalyst includes a second-generation Hoveyda-Grubbs-type olefin metathesis catalyst and/or an entity derived therefrom. In some embodiments, the metathesis catalyst includes one or a plurality of the ruthenium carbene metathesis catalysts sold by Materia, Inc. of Pasadena, Calif. and/or one or more entities derived from such catalysts. Representative metathesis catalysts from Materia, Inc. for use in accordance with the present teachings include but are not limited to those sold under the following product numbers as well as combinations thereof: product no. C823 (CAS no. 172222-30-9), product no. C848 (CAS no. 246047-72-3), product no. C601 (CAS no. 203714-71-0), product no. C627 (CAS no. 301224-40-8), product no. C571 (CAS no. 927429-61-6), product no. C598 (CAS no. 802912-44-3), product no. C793 (CAS no. 927429-60-5), product no. C801 (CAS no. 194659-03-9), product no. C827 (CAS no. 253688-91-4), product no. C884 (CAS no. 900169-53-1), product no. C833 (CAS no. 1020085-61-3), product no. C859 (CAS no. 832146-68-6), product no. C711 (CAS no. 635679-24-2), product no. C933 (CAS no. 373640-75-6).

In some embodiments, the metathesis catalyst includes a molybdenum and/or tungsten carbene complex and/or an entity derived from such a complex. In some embodiments, the metathesis catalyst includes a Schrock-type olefin metathesis catalyst and/or an entity derived therefrom. In some embodiments, the metathesis catalyst includes a high-oxidation-state alkylidene complex of molybdenum and/or an entity derived therefrom. In some embodiments, the metathesis catalyst includes a high-oxidation-state alkylidene complex of tungsten and/or an entity derived therefrom. In some embodiments, the metathesis catalyst includes molybdenum (VI). In some embodiments, the metathesis catalyst includes tungsten (VI). In some embodiments, the metathesis catalyst includes a molybdenum- and/or a tungsten-containing alkylidene complex of a type described in one or more of (a) Angew. Chem. Int. Ed. Engl., 2003, 42, 4592-4633; (b) Chem. Rev., 2002, 102, 145-179; and/or (c) Chem. Rev., 2009, 109, 3211-3226, each of which is incorporated by reference herein in its entirety, except that in the event of any inconsistent disclosure or definition from the present specification, the disclosure or definition herein shall be deemed to prevail.

In certain embodiments, the metathesis catalyst is dissolved in a solvent prior to conducting the metathesis reaction. In certain such embodiments, the solvent chosen may be selected to be substantially inert with respect to the metathesis catalyst. For example, substantially inert solvents include, without limitation: aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc. In some embodiments, the solvent comprises toluene.

In other embodiments, the metathesis catalyst is not dissolved in a solvent prior to conducting the metathesis reaction. The catalyst, instead, for example, can be slurried with the natural oil or unsaturated ester, where the natural oil or unsaturated ester is in a liquid state. Under these conditions, it is possible to eliminate the solvent (e.g., toluene) from the process and eliminate downstream olefin losses when separating the solvent. In other embodiments, the metathesis catalyst may be added in solid state form (and not slurried) to the natural oil or unsaturated ester (e.g., as an auger feed).

The metathesis reaction temperature may, in some instances, be a rate-controlling variable where the temperature is selected to provide a desired product at an acceptable rate. In certain embodiments, the metathesis reaction temperature is greater than −40° C., or greater than −20° C., or greater than 0° C., or greater than 10° C. In certain embodiments, the metathesis reaction temperature is less than 200° C., or less than 150° C., or less than 120° C. In some embodiments, the metathesis reaction temperature is between 0° C. and 150° C., or is between 10° C. and 120° C.

The metathesis reaction can be run under any desired pressure. In some instances, it may be desirable to maintain a total pressure that is high enough to keep the cross-metathesis reagent in solution. Therefore, as the molecular weight of the cross-metathesis reagent increases, the lower pressure range typically decreases since the boiling point of the cross-metathesis reagent increases. The total pressure may be selected to be greater than 0.1 atm (10 kPa), or greater than 0.3 atm (30 kPa), or greater than 1 atm (100 kPa). In some embodiments, the reaction pressure is no more than about 70 atm (7000 kPa), or no more than about 30 atm (3000 kPa). In some embodiments, the pressure for the metathesis reaction ranges from about 1 atm (100 kPa) to about 30 atm (3000 kPa).

Methods of Treating an Oil Well

In certain aspects, the disclosure provides methods of treating a well (e.g., an oil well) including: introducing into the well a composition of any of the aforementioned aspects and/or embodiments.

Methods of Increasing the Permeability of a Subterranean Formation

In certain aspects, the disclosure provides methods of increasing the permeability of a hydrocarbon-containing subterranean formation including contacting the hydrocarbon-containing subterranean formation with an amount (e.g., an effective amount, or a permeability-inducing-effective amount) of a composition of any embodiments of the first or second aspects.

EXAMPLES

Example 1—Preparation of Unsaturated C22:1 Monoester

Into a 1 liter, 3-necked round-bottomed flask equipped with a heating mantle, magnetic stirrer, distillation head, thermocouple, and rubber septum with a nitrogen needle inlet was added the methyl 9-dodecenoate (375.3 g) followed by 1-tetradecene (207.6 g). Nitrogen was bubbled into the solution which was heated to 200° C. to reduce the amount of peroxides present. After 2 hours, the blend was cooled to 60° C. and the C827 ruthenium catalyst (30 mg, 50 ppm, Materia, Inc., Pasadena, Calif.) was added. The nitrogen inlet was removed and vacuum was applied. Over the next 4 hours the temperature was maintained between 60 to 70° C. as the vacuum fell to 0.5 torr. The vacuum was discontinued and the reaction was quenched by the addition of ethyl vinyl ether (4 mL) under the liquid's surface. The crude reaction mixture was distilled to separate the lights (60-174° C./1 torr, 42 g) and product (174-176° C./1 torr, 279 g) from the bottoms (176+° C./1 torr, 86 g).

A two-phase saponification reaction was run to remove the more water soluble diester. Hence, into a 1-liter, 3-necked round-bottomed flask equipped with a magnetic stirrer was added caustic pellets (11.00 g) and deionized water (180 g). Once dissolved, isopropyl alcohol (20.0 g) was added and swirled to mix. The product fraction was added (100 g) and rinsed in with hexanes (75 g). After stirring for 7 hours at 65° C., the gas chromatography (GC) analysis of the organic phase indicated that the reaction was complete. The organic phase was separated to afford the C22:1 monoester (40.5 g, 69.1% purity). This was further purified by silica gel column chromatography.

Example 2—Preparation of Unsaturated C24:1 Monoester

Into a 1-liter, 3-necked round-bottomed flask equipped with a heating mantle, magnetic stirrer, distillation head, thermocouple, and rubber septum with a nitrogen needle inlet was added the methyl 9-dodecenoate (375.3 g) followed by 1-hexadecene (237.9 g). Nitrogen was bubbled into the solution which was heated to 200° C. to reduce the amount of peroxides present. After 2 hours, the blend was cooled to 60° C. and the C827 ruthenium catalyst (30 mg, 50 ppm, Materia, Inc., Pasadena, Calif.) was added. The nitrogen inlet was removed and vacuum was applied. Over the next 3.5 hours the temperature was maintained between 60 to 65° C. as the vacuum fell to 0.5 torr. The vacuum was discontinued and the reaction was quenched by the addition of ethyl vinyl ether (5 mL) under the liquid's surface. The crude reaction mixture was vacuum distilled to enhance the purity of the desired monoester.

A fraction of the C24:1 monoester above 70 wt % purity, this material was directly purified by silica gel chromatography. A silica gel column (20"×2") was prepared by adding a slurry of flash silica gel (high purity grade—200 to 400 mesh, SigmaAldrich) in hexanes. Once packed with silica gel (19"), a layer of sand was added (0.5"). The purified fraction (27.3 g) was dissolved in hexanes and added to the top of the column. The column was rinsed with a small amount of hexanes and elution began.

Example 3—Preparation of Unsaturated C26:1 Monoester

Into a 1-liter, 3-necked round-bottomed flask equipped with a heating mantle, magnetic stirrer, distillation head, thermocouple, and rubber septum with a nitrogen needle inlet was added the methyl 9-dodecenoate (375.3 g) followed by 1-octadecene (268.2 g). Nitrogen was bubbled into the solution which was heated to 200° C. to reduce the amount of peroxides present. After 2 hours, the blend was cooled to 65° C. and the C827 ruthenium catalyst (30 mg, 50 ppm, Materia, Inc., Pasadena, Calif.) was added. The nitrogen inlet was removed and vacuum was applied. Over the next 4 hours the temperature was maintained between 60 to 65° C. as the vacuum fell to 0.5 torr. The vacuum was discontinued and the reaction was quenched by the addition of ethyl vinyl ether (5 ml) under the liquid's surface. The crude reaction mixture was vacuum distilled to enhance the purity of the desired monoester.

A fraction of the C26:1 monoester that was above 70 wt % purity, the material was directly purified by silica gel chromatography. A silica gel column (20"×2") was prepared by adding a slurry of flash silica gel (high purity grade (200 to 400 mesh, SigmaAldrich) in hexanes. Once packed with 19" of silica gel, a layer of sand was added (0.5") and the fraction (30 g) was dissolved into hexanes and added to the top of the column.

Example 4—Addition of Hydrophilic Group to C24:1 Ester

To a dry 50-mL three-neck glass round bottom flask were added C24:1 ($\Delta$9) methyl ester (10.0232 g) and N,N-dimethylaminopropylamine (3.2258 g). The reactor was equipped with a short-path distillation head, nitrogen inlet and outlet, sampling port (rubber septum) and magnetic stirbar. The reactor was inerted with nitrogen. Nitrogen was sparged into the reaction medium for 15 min then readjusted such that the flow of nitrogen passed over the reactor contents. A catalytic amount of sodium methoxide (0.21 mL, 0.50 wt % of C24:1 ME, as a 25 wt % solution in methanol) was added via syringe through the rubber septum. The reactor was warmed on a heating mantle with stirring to 120° C. and digested at this temperature for 10 h, until complete consumption of the methyl ester substrate was confirmed by FTIR. To neutralize the reaction catalyst, 0.1 N HCl solution in isopropanol (9.15 mL) was added via syringe, below the surface of the reactor contents. Heating was discontinued and the reactor cooled to room temperature. The nitrogen inlet on the reactor was removed then a high vacuum line was introduced in the place of the nitrogen outlet on the short-path distillation head. Excess DMAPA and isopropanol from the quenching step were removed under reduced pressure (5 mmHg, 100° C.). Nitrogen was used to restore to the reactor to ambient pressure and the molten C24:1($\Delta$9) DMAPA amide (10.8672 g, 91% yield) was transferred to a glass container. The product solidified on cooling giving an off-white wax. FTIR (cm$^{-1}$) 3314, 2919, 2850, 1637, 1543, 1468.

Example 5—Addition of Hydrophilic Group to C26:1 Ester

To a dry 50 mL three-neck glass round bottom flask were added C26:1 ($\Delta$9) methyl ester (10.0207 g) and N,N-dimethylaminopropylamine (3.0005 g). The reactor was equipped with a short-path distillation head, nitrogen inlet and outlet, sampling port (rubber septum) and magnetic stirbar. The reactor was inerted with nitrogen. Nitrogen was sparged into the reaction medium for 15 min then readjusted such that the flow of nitrogen passed over the reactor contents. A catalytic amount of sodium methoxide (0.21 mL, 0.50 wt % of C26:1 ME, as a 25 wt % solution in methanol) was added via syringe through the rubber septum. The reactor was warmed on a heating mantle with stirring to 120° C. and digested at this temperature for 10 h, until complete consumption of the methyl ester substrate was confirmed by FTIR. To neutralize the reaction catalyst, 0.1 N HCl solution in isopropanol (9.15 mL) was added via syringe, below the surface of the reactor contents. Heating was discontinued and the reactor cooled to room temperature. The nitrogen inlet on the reactor was removed then a high vacuum line was introduced in the place of the nitrogen outlet on the short-path distillation head. Excess DMAPA and isopropanol from the quenching step were removed under reduced pressure (5 mmHg, 100° C.). Nitrogen was used to restore to the reactor to ambient pressure and the molten C26:1($\Delta$9) DMAPA amide (10.351 g) was transferred to a glass container. The product solidified on cooling giving an off-white wax. FTIR (cm$^{-1}$) 3315, 2918, 2850, 1637, 1544, 1469.

Example 6—Addition of Hydrophilic Group to C22:1 Ester

N,N-dimethylaminopropylamine was added to the C22:1 ester of Example 1 in a manner analogous to that employed in Examples 4 and 5.

Example 7—Oxidation of Hydrophilic-Modified C24:1 Ester

Molten C24:1 amidopropylamine (from Example 4; 70° C., 5.0166 g), deionized water (20.0 g) and sodium ethylenediaminetetraacetate (0.0278 g) were added to a 100-mL three neck glass round bottom flask equipped with a chilled water condenser, internal thermocouple, magnetic stirbar and heating mantle. The solid-liquid mixture was warmed to 55° C. with stirring, giving a uniform wax dispersion. Aqueous hydrogen peroxide (30 wt %, 1.2645 g) was added to the wax dispersion via syringe-pump over 30 minutes. The reaction was warmed to 65° C. and digested for 8 h until the concentration of hydrogen peroxide was confirmed to be less than 0.5% by peroxide test paper. Note: Isopropanol was added as needed during the reaction, when increase in viscosity became problematic for stirring and also to achieve optical clarity in the mixture. A total of 4.00 mL of isopropanol was added to the reactor. The warm semi-aqueous product solution (65° C.) was transferred to a glass container for storage. At ambient temperature (23° C.), aqueous C24:1 (Δ9) amidopropylamine oxide (21.6 g, 20.1% amine oxide, 0.3% free amine) was obtained as an opaque gel. To confirm the hydrogellation capability, a 6.0% by weight solution of the product amidopropylamine oxide was prepared in 10.0% aqueous potassium chloride. The mixture, which was fluid and heterogenous at room temperature, became viscous and clear upon heating. The observation is indicative of the formation of rod-like micelles in the aqueous potassium chloride solution, an attribute of viscoelastic surfactants.

What is claimed is:

1. A wellbore composition, comprising:
   an aqueous carrier; and
   polymers comprising constitutional units formed from the polymerization of monomer compounds of formula (II):

(II)

wherein: $X^2$ is $C_{1-24}$ alkylene, which is optionally substituted;

$R^4$ is an anionic surfactant head group, a cationic surfactant head group, a zwitterionic head group, or a non-ionic surfactant head group;

$R^5$ is $C_{1-60}$ alkyl or $C_{2-60}$ alkenyl, each of which is optionally substituted; and $R^6$ is —H or $C_{1-6}$ alkyl, which is optionally substituted.

2. The wellbore composition of claim 1, wherein $R^4$ comprises a quaternary ammonium group, which is optionally substituted.

3. The wellbore fluid of claim 1, wherein $X^2$ is a straight-chain $C_{4-10}$ alkylene, which is optionally oxidized at the carbon atom adjacent to $R^4$.

4. The wellbore composition of claim 3, wherein $X^2$ is —(C=O)—(CH$_2$)$_7$— or —(CH$_2$)$_8$—.

5. The wellbore composition of claim 4, wherein $X^2$ is —(CH$_2$)$_8$—.

6. The wellbore composition of claim 1, wherein $R^6$ is —H.

7. The wellbore composition of claim 1, wherein $R^5$ is $C_{1-7}$ alkyl.

8. The wellbore composition of claim 7, wherein $R^5$ is methyl, ethyl, propyl, butyl, pentyl, hexyl, or heptyl.

9. The wellbore composition of claim 1, wherein $R^5$ is $C_{9-11}$ alkyl.

10. The wellbore composition of claim 9, wherein $R^5$ is nonyl, decyl, or undecyl.

11. The wellbore composition of claim 1, wherein $R^5$ is $C_{13-30}$ alkyl.

12. The wellbore composition of claim 11, wherein $R^5$ is tetradecyl, hexadecyl, octadecyl, icosanyl, docosanyl, or tetracosanyl.

13. The wellbore composition of claim 1, wherein at least 70 percent by weight of the constitutional units in the polymers are constitutional units formed from the polymerization of monomer compounds of formula (II), based on the number-average molecular weight of the polymers in the composition.

14. The wellbore composition of claim 1, wherein the polymers are formed by free-radical polymerization.

15. The wellbore composition of claim 1, wherein the number-average molecular weight of the polymers ranges from 1,000 Da to 200,000 Da.

16. The wellbore composition of claim 1, further comprising one or more additives or additional ingredients.

17. A method of treating a well, comprising:
    introducing to a well the wellbore composition of claim 1.

18. The method of claim 17, wherein the well is an oil well or a gas well.

19. A method of increasing the permeability of a hydrocarbon-containing subterranean formation, comprising:
    contacting a subterranean hydrocarbon-containing formation with the wellbore composition of claim 1.

* * * * *